Figures 1, 2:
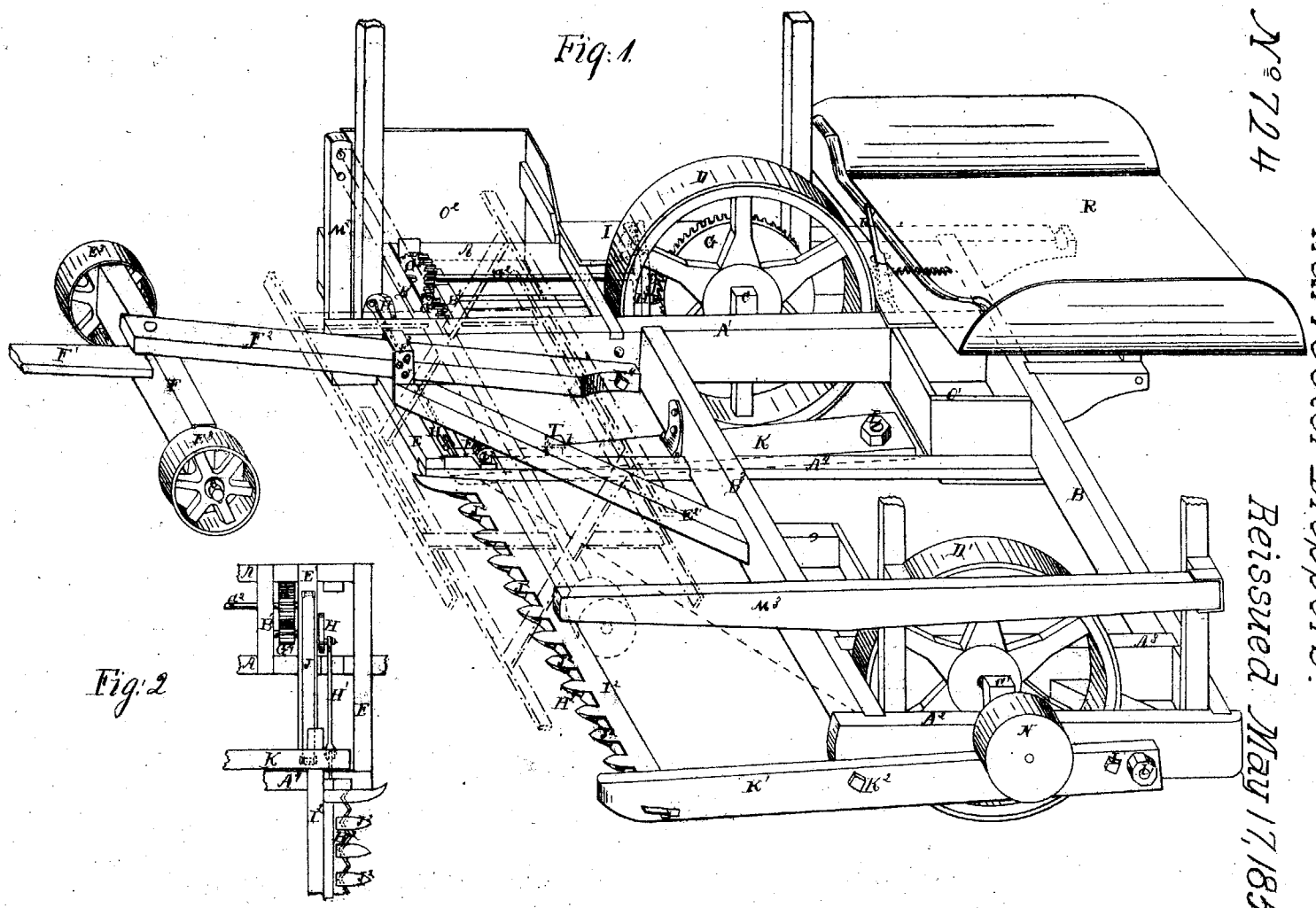

Sylla & Adams.

Harvester Droppers.

No. 724 Reissued May 17, 1859.

Sylla & Adams.
Harvester Droppers.
No. 724
Reissued May 17, 1859
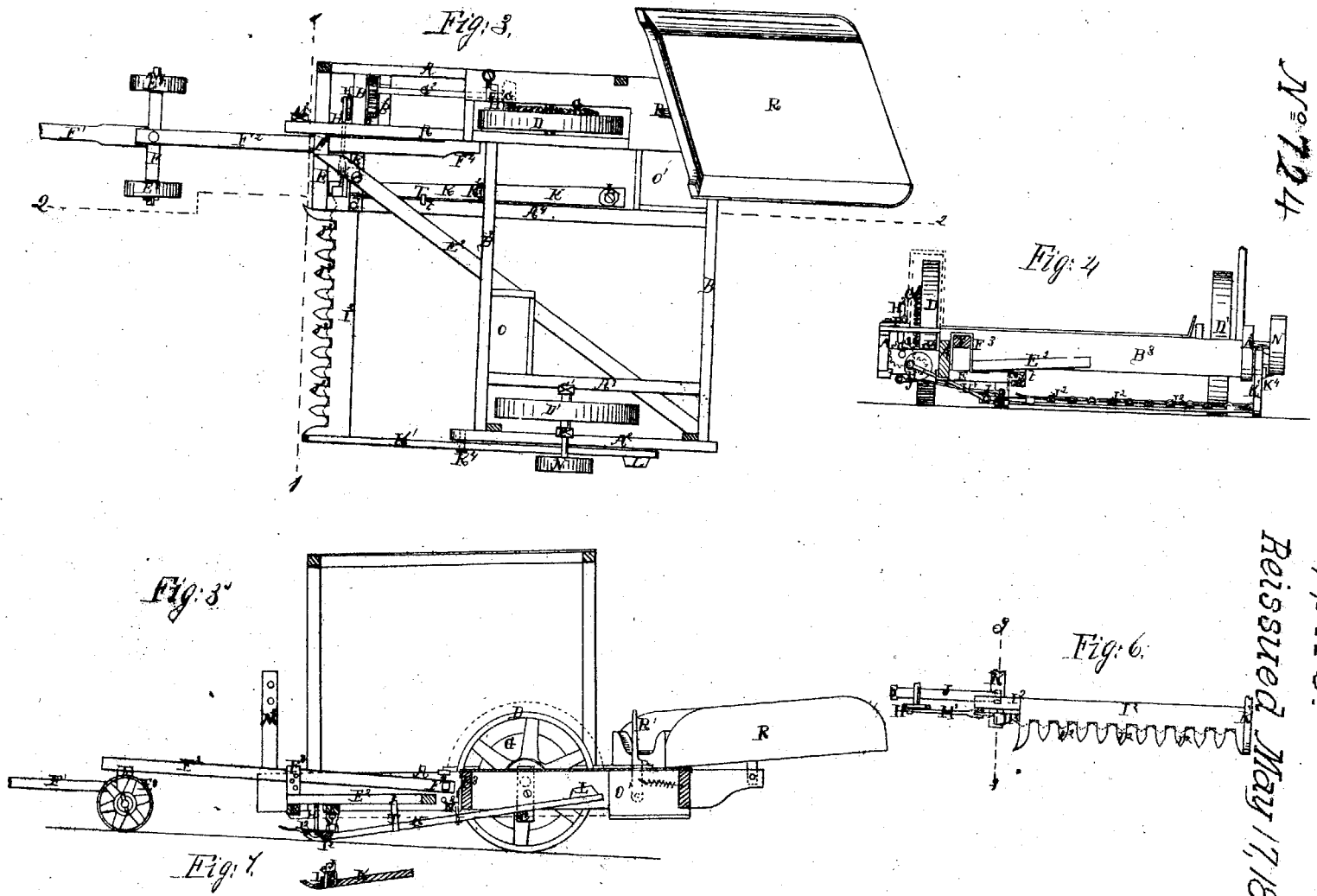

UNITED STATES PATENT OFFICE.

PHILO SYLLA, OF ELGIN, AND AUGUSTUS ADAMS, OF SANDWICH, ILLINOIS, ASSIGNORS TO C. AULTMAN & CO., OF CANTON, OHIO.

IMPROVEMENT IN GRAIN AND GRASS HARVESTERS.

Specification forming part of Letters Patent No. 10,038, dated September 20, 1853; Reissue No. 724, dated May 17, 1859.

DIVISION D.

*To all whom it may concern:*

Be it known that PHILO SYLLA, of Elgin, in the county of Kane and State of Illinois, and AUGUSTUS ADAMS, formerly of the same place, but now residing at Sandwich, in the county of De Kalb, in said State, invented certain new and useful Improvements in Machines for Harvesting Grain, Mowing Grass, &c., of which the following is a full, clear, and exact description, reference being had to the annexed drawings, which make part of this specification, and in which—

Figure 1 is a view in perspective of a machine showing one mode of applying said improvements, the finger-beam being raised from the ground to adapt the machine for reaping. Fig. 2 represents a plan of a portion of the under side of the machine, to exhibit more fully the flexible connection of the finger-beam with the main frame. Fig. 3 represents a plan of the machine, the finger-beam resting on the ground to adapt the machine for mowing. Fig. 4 represents a vertical transverse section of the machine at the line 1 1 of Fig. 3. Fig. 5 represents a vertical longitudinal section of the same at the line 2 2 of Fig. 3; and Fig. 6 represents a plan of the cutting apparatus, the finger-beam, and the coupling-arm for connecting the finger-beam to the main frame. Fig. 7 is a vertical section at the line 3 3 of Fig. 6, showing the provision for allowing play in the joint between the finger-beam $I^2$ and the yielding-bar K.

That side of the machine which runs next the standing grain we call the "left" side, and the other at which the horses are placed we call the "right" side.

The accompanying drawings represent a machine having a frame large enough to support, in addition to the cutting apparatus and machinery required for mowing, a removable platform placed behind the cutter, (such as is common in ordinary machines adapted to reaping and mowing,) an elevated table behind the platform to bind the grain upon, stands for a raker and binders, a dumping-tray to carry the sheaves until a sufficient quantity for a shock has accumulated and then to dump them in a heap upon the ground, and a stand or place for the driver of the team by which the machine is drawn.

Whenever it may be expedient to use one or more of the several parts or branches of said improvements separate from the rest, such part or parts might be used in connection with frames and gearing more convenient than those herein described, which are proportioned and arranged with reference to the use of the whole of the parts together, and it is obvious that several parts of the said improvements are applicable to various other reaping or mowing machines in use. One mode of applying each of these improvements to practical use is shown in this machine. It is therefore unnecessary to specify the manner of applying the parts respectively to other machines, as the ordinary skill of a constructor is sufficient for that purpose.

If the finger-beam of a machine for mowing be connected to the part of a machine by which it is drawn over the ground by a hinge at its end on a level with or below the plane of the cutter, the part to which it is so hinged will shove the cut grass before it until a wad is formed, which at length passes under the part which carries the hinge, and raising it, and with it the finger-beam, makes a balk in the mowing. This liability of the finger-beam to be thrown up and make a balk when hinged to a yielding coupling-arm is far greater than it would be if it was rigidly connected to and could not rise without lifting the main frame.

To overcome these difficulties is the object of the improvement claimed under this patent, which consists in arranging the hinge by which the finger-beam is drawn and permitted to yield upward and downward above the plane of the cutter and as far above the ground as it can be placed, and permit the finger-beam to run on the ground without subjecting the hinge to too great vertical leverage. The best height for the hinge will of course vary with the relative strength and arrangement of the parts, but it should in no case be lower than the top of the finger-beam.

In the accompanying drawings, the main frame A $A'$ $A^2$ $A^3$ $A^4$ B $B'$ $B^2$ $B^3$ E $E'$ $E^2$ is supported upon two wheels, D and $D'$, whose journals rest in bearings in blocks C C′, made adjustable to set the frame at a variable distance from the ground. This frame is heavier in front of than behind the axis of the wheels D D′, and the preponderating weight is sustained by a truck in front, composed of two wheels, $E^3$ $E^3$, and an axle, F, and connected with the main frame by a draft-bar, $F^2$, hinged at its rear end on a pivot, $F^4$, to the beam A′ of the frame. For the purpose of allowing the front of the main frame to be raised, lowered, and held at different heights, the draft-bar passes through a strap, $F^3$, attached to the beams E and A′, and a wedge placed between the top of the strap and the draft-bar holds the front of the frame at any required height within the range of adjustment allowed by the strap, and it may be lowered by withdrawing the wedge, and may be held down by placing the wedge between the under side of the draft-bar and the bottom of the strap. A like effect may be produced by passing a pin through the strap above or below the draft-bar in the holes made for the pin in the sides of the strap. By these means the connection of the draft-bar with the frame may by turns be limber or rigid, and the front of the frame set at various heights from the ground. When the wedge and pin are withdrawn the front of the main frame and the front end of the tongue respectively are free to play up and down within the limits of the strap independently of each other. The ends attained by the adjustment already described may likewise be attained, to a certain extent, by adjusting the pivot $F^4$ on which the rear end of the draft-bar $F^2$ hinges from one hole to another in a series formed for its reception in the side of the beam A′.

The tongue F′, by which the horses draw the machine, is attached to and extends forward from the axle of the truck.

The motion of the cutter in this machine is derived from one of the wheels which carry the main frame. On the side of the right wheel, D, a bevel-wheel, G, is secured, which takes into and drives a pinion, G′, on a counter-shaft, $G^2$, which also carries a spur-wheel, $G^3$, that takes into and drives a pinion, $G^4$, on the end of a shaft whose opposite end carries a crank, H, which, through a connecting-rod, H′, jointed to the cutter-bar $H^2$, communicates a vibratory motion to a cutter arranged to play through a series of guard-fingers, $J^2$, projecting from the front side of the finger-beam $I^2$. The bearing of that end of the shaft $G^2$ which carries a pinion, G, is in an upright arm, $H^3$, hinged at its lower end to the frame, so that by turning this arm toward or from the wheel D the pinion may be thrown into or out of gear with the wheel to put the cutter into or out of motion. The pinion is held in either position at will by means of a notched detent, I, pivoted to the main frame.

The cutter $H^2$ and guard-fingers $J^2$ are of the usual construction, and supported by the finger-beam in the usual manner.

The right end of the finger-beam $I^2$ is connected to the frame by means of a strong link or coupling-arm, J, hinged at its left end to the right end of the finger-beam, and at its right end to a cross-beam, E′, of the main frame.

As the coupling-arm, if hinged to the end or under side of the finger-beam, would trail on the stubble, push the cut grass before it, and thereby impede the operation of the machine, the hinge for connecting the finger-beam and coupling-arm is arranged on the upper side of the finger-beam and above the plane of the cutter, thus keeping the coupling-arm from approaching too near the ground.

The progressive motion of the frame on its wheels carries forward the coupling-arm, and that in its turn carries forward the finger-beam and cutter, and as the coupling-arm is rigid laterally only, and its left end (to which the finger-beam is connected) free to rise and fall, the finger-beam necessarily rests on the surface of the ground. Therefore in passing over undulating ground the finger-beam will rise or fall at either or both ends, and sway up and down within certain limits, as may be required to conform to the surface of the ground.

The remaining portions of the machine, which relate more particularly to other branches of the improvements of the said inventors, are described more fully in patents granted therefor of the same date at this, and need not therefore be further described herein.

What is claimed under this patent as the invention of the said SYLLA and ADAMS is—

The combination of the finger-beam with the hinges by which it is drawn arranged above the plane of the cutter, substantially as herein set forth.

In testimony whereof we have hereunto subscribed our names.

CORNELIUS AULTMAN,
LEWIS MILLER,
THOMAS R. TONNER,
JACOB MILLER,
GEORGE COOK,

*Composing the firm of C. Aultman & Co.*

Witnesses:

DANIEL GOTSHALL,
ISAAC HAZLETT.